(12) United States Patent
Grady et al.

(10) Patent No.: US 6,901,758 B2
(45) Date of Patent: Jun. 7, 2005

(54) METHOD FOR REPAIRING AN AIR COOLED COMBUSTOR LINER SEGMENT EDGE PORTION AND REPAIRED SEGMENT

(75) Inventors: Wayne Ray Grady, Fairfield, OH (US); Michael Philip Hagle, Mason, OH (US)

(73) Assignee: General Electric Company, Schenectady, NY (US)

( * ) Notice: Subject to any disclaimer, the term of this patent is extended or adjusted under 35 U.S.C. 154(b) by 75 days.

(21) Appl. No.: 10/637,353

(22) Filed: Aug. 8, 2003

(65) Prior Publication Data

US 2005/0028527 A1 Feb. 10, 2005

(51) Int. Cl.$^7$ .............................................. F23R 3/32
(52) U.S. Cl. ................... 60/752; 29/890.01; 29/890.02
(58) Field of Search ...................... 60/752; 29/890.02, 29/890.01

(56) References Cited

U.S. PATENT DOCUMENTS

| | | |
|---|---|---|
| 4,028,788 A | 6/1977 | DeMusis |
| 4,128,929 A | 12/1978 | DeMusis |
| 4,305,697 A | 12/1981 | Cohen et al. |
| 4,657,171 A | 4/1987 | Robins |
| 5,183,390 A | 2/1993 | Amos |
| 5,289,687 A | 3/1994 | Kress et al. |
| 5,355,668 A | 10/1994 | Weil et al. |
| 5,622,638 A | 4/1997 | Schell et al. |
| 5,794,338 A | 8/1998 | Bowden, Jr. et al. |
| 6,546,627 B1 * | 4/2003 | Sekihara et al. ........... 29/889.1 |

* cited by examiner

Primary Examiner—Ehud Gartenberg
(74) Attorney, Agent, or Firm—Stephen H. Friskney; Lee H. Sachs

(57) ABSTRACT

An air-cooled combustor liner segment, including a plurality of spaced apart radially outwardly extending integral heat exchange protuberances or pins is repaired by providing a replacement edge member for a service damaged edge portion including such pins. The damaged edge portion is removed to provide a segment body with a body repair surface, of a first shape, from which the damaged edge portion was removed. A replacement edge member is provided including a plurality of spaced apart radially outwardly extending integral pins to replace pins in the removed edge portion. The replacement edge member includes a replacement edge member repair surface of a second shape matched with the first shape of the body repair surface. The body repair surface and the replacement edge member repair surface are disposed in juxtaposition at a matched junction therebetween so that their respective radially outer surfaces substantially are coextensive. Then the replacement edge member and the segment body are joined by bonding at the matched junction substantially without change in the cooling air flow control about the protuberances.

15 Claims, 3 Drawing Sheets

METHOD FOR REPAIRING AN AIR COOLED COMBUSTOR LINER SEGMENT EDGE PORTION AND REPAIRED SEGMENT

BACKGROUND OF THE INVENTION

This invention relates to turbine engine combustor air-cooled liner segments and, more particularly, to repair of a damaged edge portion of such segment.

One form of a turbine engine, for example an axial flow gas turbine engine to propel aircraft or marine vessels or to generate electrical power, includes a combustion section disposed generally between an axially forward compressor section and an axially aft turbine section. As is well known in the gas turbine engine art, air from the compressor section is mixed with fuel in the combustion section and ignited to provide hot expanding products of combustion for extraction of power by the turbine section. Such combustion of fuel in a rapidly flowing pressurized air atmosphere generates very strenuous high temperature environmental oxidizing and corrosive conditions along with highly erosive conditions all of which can damage components of the combustion section.

One form of a currently used combustion section is called an annular combustor. As used herein, terms such as "annular", "radial", "circumferential", "axial", etc. refer to directions about a typical axial flow gas turbine engine. One form of an annular combustor comprises an outer annular frame-like member carrying within its annular interior in which combustion is conducted at least one fuel nozzle, baffles, and a combustor liner, for example comprising a plurality of generally arcuate combustor liner segments. Such segments, typically precision cast from a high temperature alloy based on at least one of Fe, Co, and Ni interface between and protect the outer frame from conditions within the combustor as well as guide the combustion and its products. In one embodiment, each such combustor liner segment is protected on its radially inner surface with a commercially available thermal barrier coating (TBC), one example of which primarily is yttria stabilized with zirconia. In addition, cooling air is passed over the segments' radially outer surfaces that include there-across a plurality of spaced-apart generally radially outward extending protuberances or pin-like structures functioning as heat exchange surfaces or members and designed with spaces therebetween to control cooling air flow about the protuberances.

In their annular, circumferentially arcuate disposition about the combustor interior to define the combustor liner, the segments partially overlap one another axially downstream so that the cooling air traversing the radially outer surface of a segment between the protuberances is discharged over a portion of the TBC of a superimposed adjacent segment. Nevertheless, it has been observed after service operation, that the strenuous engine operating conditions can result in damage to or erosion of a downstream edge portion of certain combustor liner segments. Because such cast segments, including the radially outer spaced-apart pin-like structure, is relatively expensive to manufacture, typically by a lost wax type precision casting, it is desirable to repair rather replace such a member. However, a low cost repair method has not been available and damaged liner segments have been discarded.

Repair by bonding of a replacement edge portion by typical current bonding methods can result in flow of excessive metal flow about such protuberances. For example, current brazing methods including disposing brazing alloy at a face or surface that includes the protuberances, or bonding by typical fusion welding that melts at least a portion of parent metal as well as any weld metal, can result in excessive brazing or molten alloy flow. Such excessive flow can block, interfere with, and/or change a designed pattern and/or amount of cooling airflow on the segment radially outer surface. Provision of a segment repair method that maintains the integrity of the radially outer surface designed cooling air-flow control and, in one preferred form provides the segment with enhanced oxidation resistance at an operating temperature, can improve and enable repair rather than replacement of damaged combustor liner segments.

BRIEF SUMMARY OF THE INVENTION

The present invention, in one embodiment, provides a method for repairing a damaged edge portion of an air-cooled metal combustor liner segment substantially without change in the cooling air flow control over the segment. The segment edge portion is disposed and connected between a segment radially inner surface and a segment radially outer surface spaced apart from and opposed to the segment radially inner surface. The segment radially outer surface includes a plurality of spaced-apart generally radially outwardly extending heat exchange first protuberances integral with and across the segment radially outer surface including into the damaged edge portion. The first protuberances include spaces therebetween designed to provide cooling air flow control about the protuberances.

The method comprises removing the damaged edge portion to provide a segment body having a body repair surface from which the damaged edge portion was removed. A metal replacement edge member is provided with a replacement edge member repair surface shaped to match the body repair surface, a replacement edge member radially outer surface and a plurality of spaced apart radially outwardly extending heat exchange second protuberances integral with and across the replacement edge member radially outer surface to replace the first protuberances integral with the damaged edge portion. The replacement edge member repair surface and the body repair surface are disposed in juxtaposition at a matched junction therebetween with their respective radially outer surfaces substantially coextensive. Then the replacement edge member and the segment body are bonded at the matched junction substantially without change in the cooling air flow control about the first and second protuberances.

Another form of the present invention is a repaired air-cooled combustor liner segment having a metal segment body including a segment body radially outer surface having a plurality of spaced apart radially outwardly extending heat exchange first protuberances integral with and across the segment radially outer surface. The first protuberances include spaces therebetween designed to provide cooling air flow control about the protuberances. The segment body and its radially outer surface extend to a body repair surface. Secured to the segment body at the body repair surface at a bonded joint is a metal replacement edge member including a replacement edge member radially outer surface including a plurality of spaced apart radially outwardly extending heat exchange second protuberances integral with and across the replacement edge member radially outer surface. The second protuberances include spaces therebetween designed to provide cooling air flow control about the second protuberances. The replacement edge member and its radially outer surface extend to a replacement edge member repair surface to which the body repair surface is secured at the bonded joint. The radially outer surfaces of the segment body and the replacement edge member are substantially coextensive through the bonded joint so that the cooling air flow control about the first and second protuberances is maintained substantially without interference by the bonded joint.

DETAILED DESCRIPTION OF THE INVENTION

A combustor liner provides protection for a gas turbine engine combustor case or structural support during ignition of fuel in pressurized air during engine operation. Forms of annular type combustors, including an air cooled combustor liner or inner case, and associated fuel nozzles, baffles, etc., are shown in U.S. Pat. No. 5,289,687—Kress et al; and U.S. Pat. No. 5,355,668—Weil et al. In forms of such annular combustor liners, the combustor liners comprise a plurality of combustor liner segments in an annular assembly of at least partially overlapping annular rings. Cooling air flowing over the radially outer surface of the segments passes between the assembled rings and is discharged into the combustor interior. Nevertheless, corrosive and/or erosive type damage to an edge portion of certain combustor liner segments has been observed after engine service operation. The present invention provides a repair of such damage and a repaired combustor liner segment.

Figure 1:
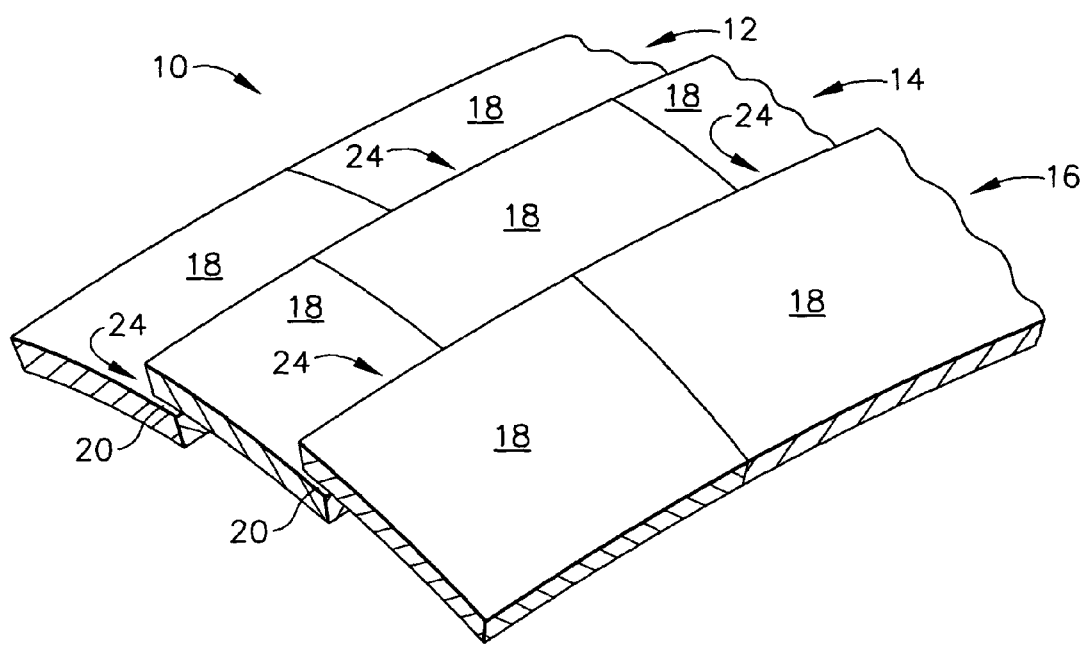
FIG. 1 is a diagrammatic, perspective, fragmentary, partially sectional view of a portion of an assembly of combustor liner segments typically disposed to define an annular combustor liner.

The perspective, fragmentary partially sectional view of FIG. 1 shows a portion of an annular combustor liner segment assembly generally at 10 of partially generally axially overlapping circumferential rings 12, 14, 16, etc. Each ring is comprised of circumferentially juxtaposed combustor liner segments 18, in this embodiment made of a first metal alloy having a first oxidation resistance property. For example, the first metal alloy can be a typical commercial high temperature Ni base alloy of a type available as Rene' 77 alloy, forms of which are described in U.S. Pat. No. 3,457,666—Pohlman et al., or of a type available as Rene' 80 alloy, forms of which are described in U.S. Pat. No. 3,615,376—Ross et al. Rings 12, 14 and 16 are maintained radially spaced apart one from another across gaps 20 by a plurality of heat exchange first protuberances, for example pins, shown in more detail at 22 in FIGS. 2–7. Pins 22, extending generally radially outwardly from and across a segment radially outer surface 30 of each combustor segment 18, include spaces 23 therebetween, shown in more detail in FIGS. 5–7, designed to control the flow of cooling air about pins 22. Cooling air, shown by arrows 24, passes through gaps 20, spaces 23 and about pins 22.

Figure 2:
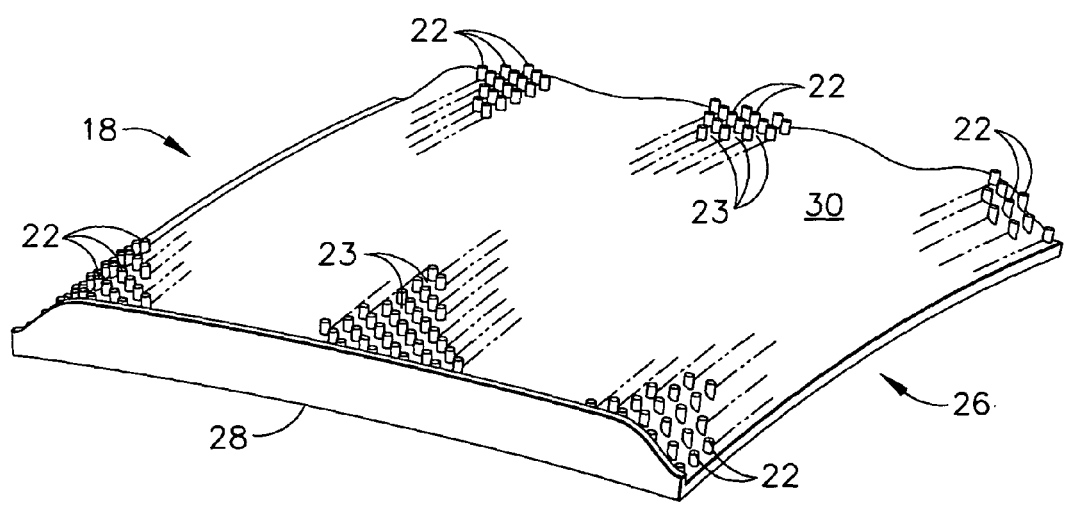
FIG. 2 is an enlarged perspective, fragmentary view of a combustor liner segment of FIG. 1 before engine service operation.

FIG. 2 is an enlarged, perspective fragmentary view of a combustor liner segment 18 of FIG. 1. Combustor finer segment 18 includes an edge portion 26 connected between segment radially inner surface 28 and segment radially outer surface 30 spaced apart from inner surface 28. Radially outer surface 30 includes a plurality of the spaced-apart radially outwardly extending heat exchange first protuberances or pins 22 integral with and across outer surface 30 and extending onto edge portion 26. As used herein, the phrase "radially outwardly extending" is not limited to exactly normal to a surface but is intended to mean extending generally radially outwardly from the surface with which it is integral. Cooling air 24 passes about pins 22 and through spaces 23 therebetween on surface 30. Pins 22 are designed and positioned to provide flow control for cooling air 24 as well as to function as heat exchange turbulators. In addition, pins 22 at least assist in defining gap 20 between partially overlapping rings 12, 14, 16, etc. For thermal protection, inner surface typically includes a commercial thermal barrier coating (not shown), for example of the type identified above.

Figure 3:
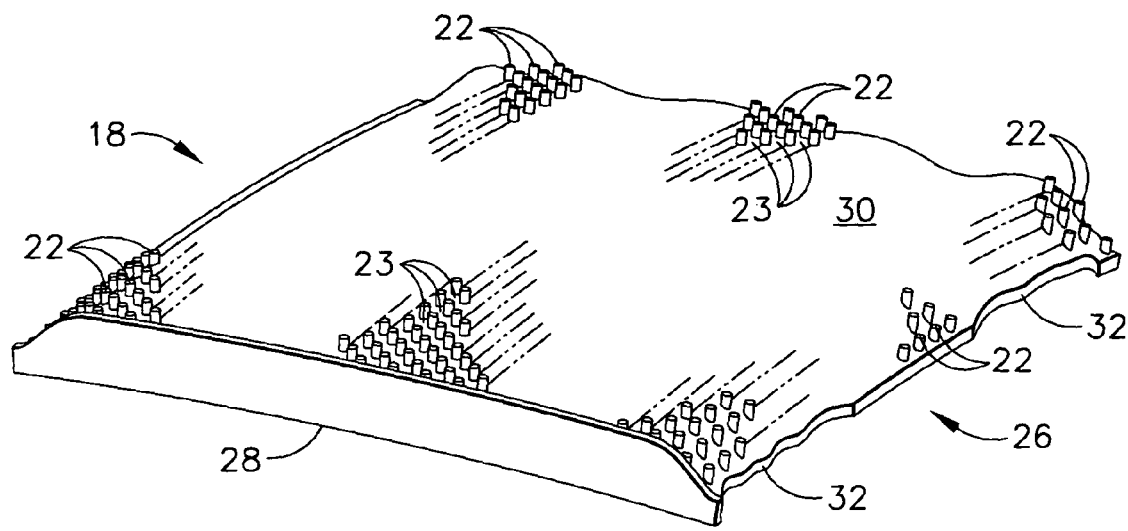
FIG. 3 is a perspective, fragmentary view of a damaged edge portion of the segment of FIG. 2 after engine service operation.

After engine service operation of combustor liner segment 18 shown diagrammatically in the fragmentary perspective view of FIG. 3, it has been observed that thermal oxidation, sulfidation and/or erosion has resulted in a damaged portion 32 of at least some of edge portion 26 that includes integral pins 22. In some examples, such damaged portion 32 has lost edge portion 26 and its pins 22 to an extent that repair of edge portion 26 or replacement of such segment 18 is required. As was mentioned before, removal and replacement of damaged portion 26 typically using ordinary fusion welding or brazing methods, for example brazing that disposes brazing alloy on radially outer surface 30, can result in excessive flow of alloy about pins 22. Such excess material on surface 30 can block or change the designed flow and/or pattern of cooling air about the segment. Use of "stop-off" materials on surface 30 in brazing to inhibit excess brazing alloy flow has been found to be impractical for such a complex structure.

Figure 4:
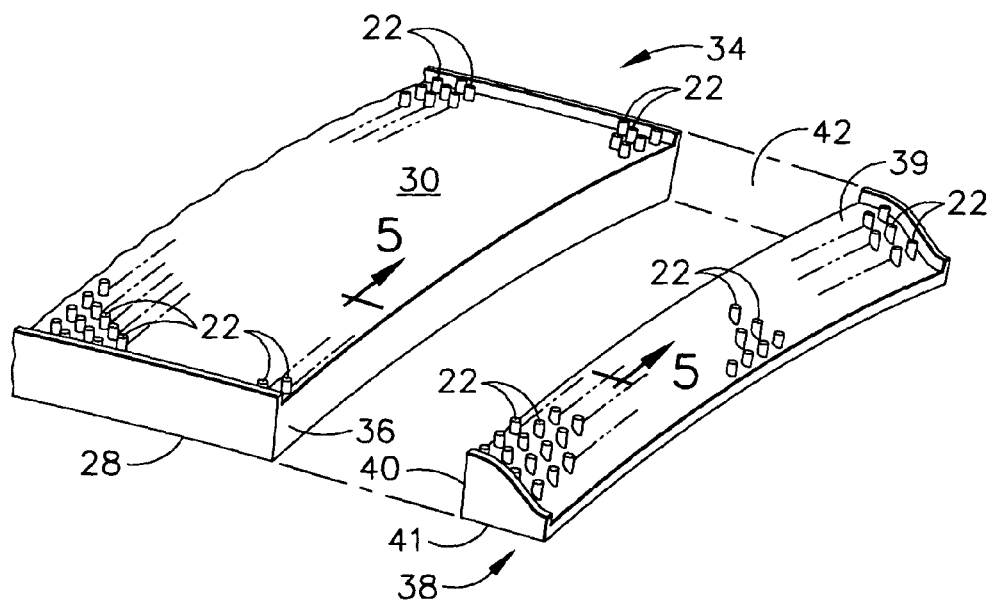
FIG. 4 is a perspective, fragmentary exploded view of the segment of FIG. 3 after removal of the damaged edge portion and provision of a replacement edge portion.

According to a form of the present invention, damaged portion 32 of edge portion 26, including first pins 22, is removed, for example by machining or grinding, to provide segment body 34 as shown in the perspective, fragmentary exploded view of FIG. 4. Such removal provides segment body 32 with body repair surface 36 of a first shape. Provided to replace removed damaged portion 32 is a replacement edge member 38 including a plurality of spaced apart radially outwardly extending heat exchange second, replacement pins 22. As were the first pins, the replacement pins are integral with and extend radially outwardly from and across replacement edge member radially outer surface 39 to replace first pins 22 of removed damaged portion 32. Replacement edge member 38 includes radially inner surface 41 spaced apart from radially outer surface 39.

In this embodiment, member 38 is of a second metal alloy different from the original or first alloy from which segment 18 was made at least to the extent that it has an oxidation resistance property at an operating temperature greater than that of the original alloy. In one example, member 38 was made of a high temperature Co base alloy of a type commercially available as Mar-M-509 alloy, typical of certain other commercial high temperature alloys based on Co and having an oxidation resistance property at the operating temperature greater than the above identified Rene' 77 and Rene' 80 Ni base alloys. Typical oxidation rate test data under Mach 0.05 conditions for less than about 500 hours comparing Ni base and Co base alloys included an oxidation rate (mils/hour) at 1900° F. for Rene' 80 alloy of about 0.05 compared with Mar-M-509 alloy only of about 0.03; and at 2000° F. for Rene' 80 alloy of about 0.1 compared with Mar-M-509 alloy only of about 0.06.

Member 38 is of a second shape matched with the first shape of removed damaged portion 32 and includes a replacement edge member repair surface 40 shaped to match body repair surface 36. As used herein in respect to the relative shapes of cooperating repair surfaces 38 and 40, terms such as "matched" or "matches" means shaped to enable provision of a very narrow generally uniform gap, and preferably contact, between such surfaces when in juxtaposition.

In practice of a form of the present invention, body repair surface 36 and replacement edge member repair surface 40 are disposed in close juxtaposition, preferably substantially in contact, at a matched junction 42 therebetween so that segment body radially outer surface 30 and replacement edge member radially outer surface 39 substantially are coextensive. Then replacement edge member 38 and segment body 34 are joined by bonding replacement edge member surface 40 to body replacement surface 36 at junction 42 across a bonded joint that does not change and that maintains control of cooling air flow 24 about the pins or protuberances 22. As used herein, terms relating to no change in cooling air flow control or maintaining cooling air flow control is intended to mean no change, other than minor, that materially affects a designed cooling air flow about pins 22.

One preferred embodiment of such bonding was by welding using a low energy welding method that focuses energy at junction 42 to result in a very narrow total heat affected zone adjacent the weld. As is well known in the metallurgical art, a heat affected zone, sometime referred to as HAZ, adjacent a weld is the extent into a substrate at the weld in which local changes occur to the morphology or in the microstructure of the material as a result of exposure to certain levels of heat. For example, precipitation, grain growth and/or change in grain size and hardness can occur.

Figure 5:
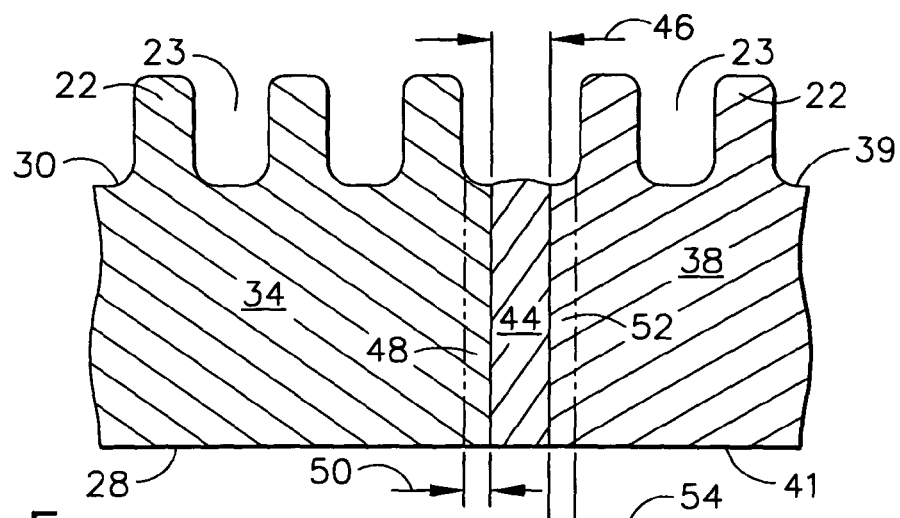
FIG. 5 is an enlarged, fragmentary sectional view in the direction of 5—5 of FIG. 4 after welding at a juncture between portions

As shown in the enlarged, fragmentary sectional view of FIG. 5, along lines 5—5 of FIG. 4, use of such focused low energy welding resulted at junction 42 in a weld 44 having a weld width 46 between segment body 34 and replacement edge member 38. Adjacent weld 44 was a first heat affected zone 48 of a first zone width 50 from the weld 44 into segment body 34, and a second heat affected zone 52 of a second zone width 52 from weld 44 into replacement edge member 38. In this embodiment, the sum of zone widths 50 and 54 was no greater than weld width 46. As shown, each of zone widths 50 and 54 was about one half of weld width 46. Examples of such welding method are commercially available as electron beam, laser, or plasma arc welding methods.

Figure 6:
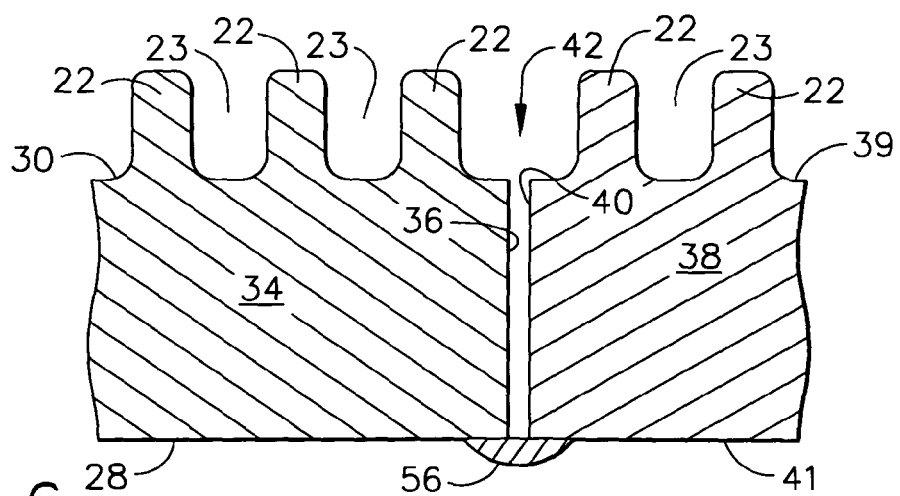
FIG. 6 is an enlarged, fragmentary sectional view as in FIG. 5 before brazing.
Figure 7:
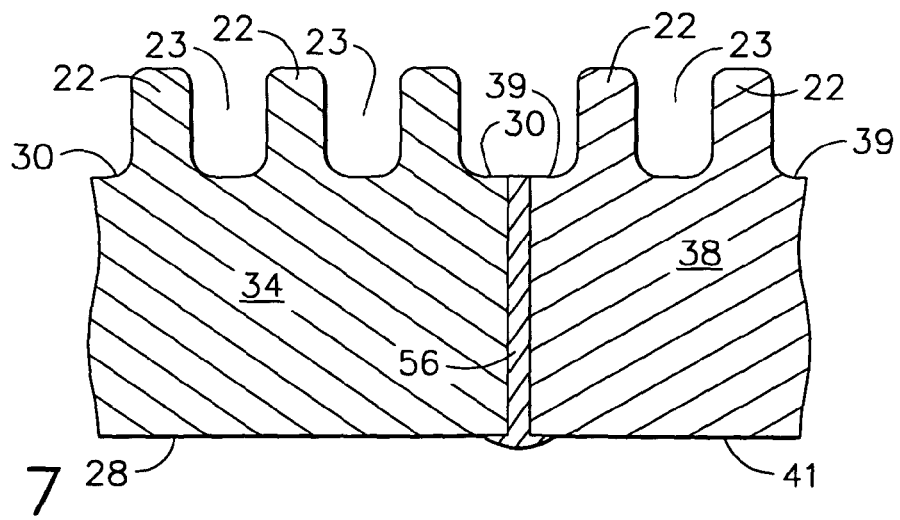
FIG. 7 is an enlarged, fragmentary sectional view as in FIG. 6 after brazing.

In another embodiment of such bonding shown in the enlarged fragmentary sectional view of FIG. 6, a brazing alloy 56 is disposed over matched junction 42 at radially inner surfaces 28 and 41, with such radially inner surfaces being positioned below radially outer surfaces 30 and 39. Such relative positioning enables the force of gravity to act on brazing alloy 56 when in a fluid condition to retain the brazing alloy within juncture 42. Then brazing alloy 56 is heated at its brazing temperature for a time sufficient to enable the brazing alloy to flow by capillary action upward into and within junction 42. As shown in the enlarged, fragmentary sectional view of FIG. 7, such flow continues until it reaches radially outer surfaces 30 and 39 substantially without extending beyond junction 42: the force of gravity inhibits further upward flow of the fluid brazing alloy. The result is that the brazing alloy flow does not interfere with or change control of cooling air flow about pins 22, and no brazing "stop-off" material is required on such radially outer surfaces. One example of practice of the brazing method form of the present invention includes use of a Ni base brazing alloy sometimes referred to as GE 108 brazing alloy having a brazing temperature in the range of about 2200–2210° F. Forms of such alloy are described in U.S. Pat. No. 3,700,427—Hoppin III, et al.

Practice of forms of the method of the present invention provides a repaired air-cooled combustor liner segment having a segment body 34 of a first alloy having a first oxidation resistance property and a replacement edge member or portion 38 of a second alloy having a second oxidation resistance property greater than the first oxidation property. In forms of a repaired air-cooled combustor liner segment, segment body 34 is bonded with replacement edge 38 at junction 42 therebetween across a bonded joint so that their respective radially outer surfaces 30 and 39 substantially are coextensive and control of cooling air flow is maintained across such surfaces and about pins 22.

The present invention has been described in connection with specific embodiments, structures, materials and methods. However, it will be understood that they are intended to be typical and representative of rather than in any way limiting on the scope of the present invention. Those skilled in the various arts involved, for example relating to turbine engines and their repair, to materials, and to material joining methods and apparatus, will understand that the invention is capable of variations and modifications without departing from the scope of the appended claims.

What is claimed is:

1. A method for repairing a damaged edge portion of a metal air-cooled combustor liner segment, the edge portion disposed and connected between a segment radially inner surface and a segment radially outer surface spaced apart from and opposed to the segment radially inner surface, the segment radially outer surface including a plurality of spaced apart radially outwardly extending heat exchange first protuberances integral with and across the segment radially outer surface including into the damaged edge portion, the first protuberances including spaces therebetween designed to provide cooling air flow control about the first protuberances, comprising the steps of:

removing the damaged edge portion, including the first protuberances integral therewith, to provide a segment body having a body repair surface from which the damaged edge portion was removed, the body repair surface having a first shape;

providing a metal replacement edge member including a replacement edge member repair surface of a second shape that matches the first shape of the body repair surface, a replacement edge member radially outer surface, a replacement edge member radially inner surface and a plurality of spaced apart radially outwardly extending heat exchange second protuberances integral with and across the replacement member radially outer surface to replace the first protuberances integral with the damaged edge portion;

disposing the body repair surface and the replacement edge member repair surface in juxtaposition at a matched junction therebetween with their respective radially outer surfaces substantially coextensive; and, bonding the replacement edge member and the segment body at the matched junction substantially without change in the cooling air flow control about the first and second protuberances.

2. The method of claim 1 in which the replacement edge member repair surface and the body repair surface are bonded by welding at the matched junction using a low energy welding method that focuses energy at the matched junction sufficient to result in a weld having a weld width between the segment body and the replacement edge member and having a first heat affected zone of a first zone width from the weld into the segment body and a second heat affected zone of a second zone width from the weld into the replacement edge member, the sum of the first and second zone widths being no greater than the weld width.

3. The method of claim 2 in which each of the first and second zone widths is about one half of the weld width.

4. The method of claim 2 in which the low energy welding method is a welding method selected from the group consisting of electron beam, laser, and plasma arc welding.

5. The method of claim 1 in which the replacement edge member repair surface and the body repair surface are bonded by controlled capillary brazing in which:

the segment body and replacement edge member radially inner surfaces are positioned below the segment body and replacement edge member radially outer surfaces;

a brazing alloy is disposed over the matched junction at the segment body and replacement edge member radially inner surfaces; and, the brazing alloy is heated at a temperature and for a time sufficient to enable and to control the brazing alloy to flow by capillary action upward into and within but substantially not beyond the matched junction.

6. The method of claim 1 in which:

the metal combustor liner segment is made of a first metal alloy having a first oxidation resistance property at an operating temperature; and, the metal replacement edge member is made of a second metal alloy having a second oxidation resistance property greater than the first oxidation resistance property at the operating temperature.

7. The method of claim 6 in which:

the first metal alloy is a Ni base alloy; and, the second metal alloy is a Co base alloy.

8. The method of claim 6 in which the combustor liner segment and the replacement edge member are precision metal castings.

9. A repaired air-cooled combustor liner segment comprising:

a metal segment body including a segment body radially outer surface having a plurality of spaced apart radially outwardly extending heat exchange first protuberances integral with and across the segment radially outer surface, the first protuberances including spaces therebetween designed to provide cooling air flow control about the protuberances, the segment body and segment body radially outer surface extending to a body repair surface;

a metal replacement edge member including a replacement edge member radially outer surface including a plurality of spaced apart radially outwardly extending heat exchange second protuberances integral with and across the replacement edge member radially outer surface and including spaces therebetween designed to provide cooling air flow control about the second protuberances, the replacement edge member and edge member radially outer surface extending to a replacement edge member repair surface; and, a bonded joint between the body repair surface and the replacement edge member repair surface, the segment body radially outer surface and the replacement edge radially outer surface being substantially coextensive through the bonded joint and the cooling air flow control about the first and second protuberances being maintained across and substantially without interference by the bonded joint.

10. The repaired segment of claim 9 in which the bonded joint is a weld having a weld width between the segment body and the replacement edge member and having a first heat affected zone of a first zone width from the weld into the segment body and a second heat affected zone of a second zone width from the weld into the replacement edge member, the sum of the first and second zone widths being no greater than the weld width.

11. The repaired segment of claim 9 in which each of the first and second zone widths is about one half of the weld width.

12. The repaired segment of claim 9 in which the bonded joint is a brazed joint wherein a brazing alloy substantially is confined to the brazed joint without extending onto the segment body radial outer surface and the replacement edge member radially outer surface about the first and second protuberances.

13. The repaired segment of claim 9 in which:

the metal segment body is made of a first metal alloy having a first oxidation resistance property at an operating temperature based; and, the metal replacement edge member is made of a second metal alloy having a second oxidation resistance property greater than the first oxidation resistance property at the operating temperature.

14. The repaired segment of claim 13 in which:

the first metal alloy is a Ni base alloy; and, the second metal is a Co base alloy.

15. The repaired segment of claim 13 in which the metal segment body and the replacement edge member are precision metal castings.

* * * * *